United States Patent
Driscoll

(10) Patent No.: US 7,805,929 B2
(45) Date of Patent: Oct. 5, 2010

(54) SELECTIVE CATALYTIC REDUCTION SYSTEM

(75) Inventor: James Joshua Driscoll, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 1161 days.

(21) Appl. No.: 11/312,346

(22) Filed: Dec. 21, 2005

(65) Prior Publication Data

US 2007/0137182 A1 Jun. 21, 2007

(51) Int. Cl.
*F01N 3/00* (2006.01)
(52) U.S. Cl. .............................. 60/286; 60/274; 60/276; 60/295; 60/301; 60/303
(58) Field of Classification Search .................. 60/274, 60/276, 285, 286, 295, 297, 301, 303
See application file for complete search history.

(56) References Cited

U.S. PATENT DOCUMENTS

| | | | |
|---|---|---|---|
| 5,047,220 A | 9/1991 | Polcer | |
| 5,628,186 A | 5/1997 | Schmelz | |
| 5,714,130 A | 2/1998 | Saito et al. | |
| 5,746,052 A | 5/1998 | Kinugasa et al. | |
| 5,950,422 A | 9/1999 | Dölling | |
| 5,964,088 A | 10/1999 | Kinugasa et al. | |
| 6,047,542 A | 4/2000 | Kinugasa et al. | |
| 6,048,510 A | 4/2000 | Zauderer | |
| 6,063,350 A | 5/2000 | Tarabulski et al. | |
| 6,092,367 A | 7/2000 | Dölling | |
| 6,109,024 A | 8/2000 | Kinugasa et al. | |
| 6,119,452 A | 9/2000 | Kinugasa et al. | |
| 6,122,910 A | 9/2000 | Hoshi et al. | |
| 6,128,898 A | 10/2000 | Sakurai et al. | |
| 6,133,185 A | 10/2000 | Kinugasa et al. | |
| 6,146,605 A | 11/2000 | Spokoyny | |
| 6,176,079 B1 | 1/2001 | Konrad et al. | |
| 6,269,633 B1 | 8/2001 | van Nieuwstadt et al. | |
| 6,289,672 B1 | 9/2001 | Katoh et al. | |
| 6,334,986 B2 | 1/2002 | Gieshoff et al. | |
| 6,338,244 B1 | 1/2002 | Guenther et al. | |
| 6,345,496 B1 | 2/2002 | Fuwa et al. | |
| 6,403,046 B1 | 6/2002 | Spokoyny | |
| 6,415,602 B1 | 7/2002 | Patchett et al. | |

(Continued)

FOREIGN PATENT DOCUMENTS

WO      WO 87/02025       4/1987

(Continued)

*Primary Examiner*—Tu M Nguyen
(74) *Attorney, Agent, or Firm*—Finnegan, Henderson, Farabow, Garrett & Dunner LLC

(57) ABSTRACT

A method of controlling ammonia and nitric oxides production for selective catalytic reduction systems is provided. The method may include producing an ammonia-containing gas stream having an ammonia concentration. The method may further include operating an engine to continuously produce a NOx-containing gas stream having a NOx concentration. The ammonia-containing gas stream may be supplied to a first exhaust system location upstream of a selective catalytic reduction catalyst, and the ammonia concentration may be determined at a first time. The NOx-containing gas stream may be supplied to a second exhaust system location upstream of the selective catalytic reduction catalyst, and the NOx concentration may be evaluated at a second time which is later than the first time. The NOx concentration may be adjusted based on the ammonia concentration at the first time.

22 Claims, 4 Drawing Sheets

U.S. PATENT DOCUMENTS

| | | |
|---|---|---|
| 6,422,005 B2 | 7/2002 | Dölling et al. |
| 6,470,673 B1 | 10/2002 | van Nieuwstadt et al. |
| 6,475,453 B1 | 11/2002 | Mathes et al. |
| 6,662,552 B1 | 12/2003 | Gunther et al. |
| 6,732,507 B1 | 5/2004 | Stanglmaier |
| 6,739,125 B1 | 5/2004 | Mulligan |
| 6,833,272 B1 | 12/2004 | Binder et al. |
| 7,213,395 B2 * | 5/2007 | Hu et al. .................. 60/286 |
| 7,475,536 B2 * | 1/2009 | Wada et al. ............... 60/295 |
| 7,485,273 B2 * | 2/2009 | Gandhi et al. ......... 423/213.2 |
| 2001/0014298 A1 | 8/2001 | Neufert |
| 2002/0102197 A1 | 8/2002 | Cooper et al. |
| 2002/0148220 A1 | 10/2002 | Patchett et al. |
| 2003/0109047 A1 | 6/2003 | Valentine |
| 2004/0076565 A1 | 4/2004 | Gandhi et al. |
| 2004/0126286 A1 | 7/2004 | deRuyter |
| 2004/0159096 A1 | 8/2004 | Yasui et al. |
| 2005/0000220 A1 | 1/2005 | Zauderer |
| 2005/0008547 A1 | 1/2005 | Kikawa et al. |

FOREIGN PATENT DOCUMENTS

| | | |
|---|---|---|
| WO | WO 98/28070 | 7/1998 |
| WO | WO 2004/058642 A1 | 7/2004 |

* cited by examiner

SELECTIVE CATALYTIC REDUCTION SYSTEM

TECHNICAL FIELD

This disclosure pertains generally to exhaust gas purification systems, and more particularly, to exhaust gas purification systems using selective catalytic reduction.

BACKGROUND

Selective catalytic reduction (SCR) provides a method for removing nitrogen oxides (NOx) emissions from fossil fuel powered systems for engines, factories, and power plants. During SCR, a catalyst facilitates a reaction between a reductant (e.g. ammonia) and NOx to produce water and nitrogen gas, thereby removing NOx from the exhaust gas. Generally, the exhaust gas ammonia is mixed with an exhaust gas stream upstream of an SCR catalyst. The ammonia may be injected directly into the exhaust gas stream or supplied as urea, which can be converted to ammonia under appropriate conditions.

To optimize NOx removal from the exhaust gas stream, while preventing release of potentially noxious ammonia, the NOx and ammonia are generally supplied at approximately one-to-one ratios. However, it may be difficult to match the quantities of ammonia and NOx produced by on-board ammonia production systems and a NOx source, such as an engine. Further, the flow rates between the ammonia production system and SCR catalyst and the NOx source and SCR catalyst may vary. Therefore, even if ammonia production and NOx production are appropriately matched, the ammonia and NOx concentrations at a downstream SCR system may be mismatched. Improved SCR systems that provide better matching of ammonia and NOx concentrations at the SCR catalyst are needed.

One method for controlling exhaust gas reductant and NOx concentrations for SCR is disclosed in U.S. Pat. No. 6,092,367, which issued to Dölling on Jul. 25, 2000 (hereinafter the '367 patent). The method of the '367 patent includes introducing a quantity of a reducing agent and setting the quantity of the reducing agent. The quantity is set using a functional relationship based on operationally-relevant parameters of a combustion installation, an exhaust gas, and a catalytic converter. The method may further include adapting the functional relationship to a current state of the catalytic converter.

Although the method of the '367 patent may provide suitable control of reductant and NOx concentrations, the method of the '367 patent may have several drawbacks. For example, the method of the '367 patent may be suitable for systems with on-board storage of ammonia or other reductants in which the reductant may be supplied proximate the SCR catalyst. However, the method of the '367 patent does not take into account variations in flow rates of ammonia and NOx, as may occur with on-board ammonia production systems.

The present disclosure is directed at overcoming one or more of the shortcomings of the prior art SCR systems.

SUMMARY OF THE INVENTION

A first aspect of the present disclosure includes a method of controlling ammonia and nitric oxides production for selective catalytic reduction systems. The method may include producing an ammonia-containing gas stream having an ammonia concentration. The method may further include operating an engine to continuously produce a NOx-containing gas stream having a NOx concentration. The ammonia-containing gas stream may be supplied to a first exhaust system location upstream of a selective catalytic reduction catalyst, and the ammonia concentration may be determined at a first time. The NOx-containing gas stream may be supplied to a second exhaust system location upstream of the selective catalytic reduction catalyst, and the NOx concentration may be evaluated at a second time which is later than the first time. The NOx concentration may be adjusted based on the ammonia concentration at the first time.

A second aspect of the present disclosure includes an engine and exhaust system. The engine and exhaust system may include an ammonia production system configured to supply ammonia to a first exhaust system location at a first time. An engine may be configured to continuously supply an exhaust gas stream to a second exhaust system location, and a control unit may be configured to control the rate of NOx production by the engine based on the rate of ammonia production at the first time.

A third aspect of the present disclosure includes a NOx-emissions control system. The system may include an ammonia production system configured to supply ammonia to a first exhaust passage at a first time. An engine may be configured to continuously supply an exhaust gas stream to a second exhaust passage. A merged exhaust passage may be disposed downstream of both the ammonia production system and the engine, and at least one selective catalytic reduction system catalyst may be in fluid communication with the merged exhaust passage. A control unit may be configured to control the rate of NOx production by the engine based on the rate of ammonia production at the first time.

BRIEF DESCRIPTION OF THE DRAWINGS

The accompanying drawings, which are incorporated in and constitute a part of this specification, illustrate exemplary embodiments of the disclosure and, together with the written description, serve to explain the principles of the disclosed system. In the drawings.

DETAILED DESCRIPTION

Figure 1:
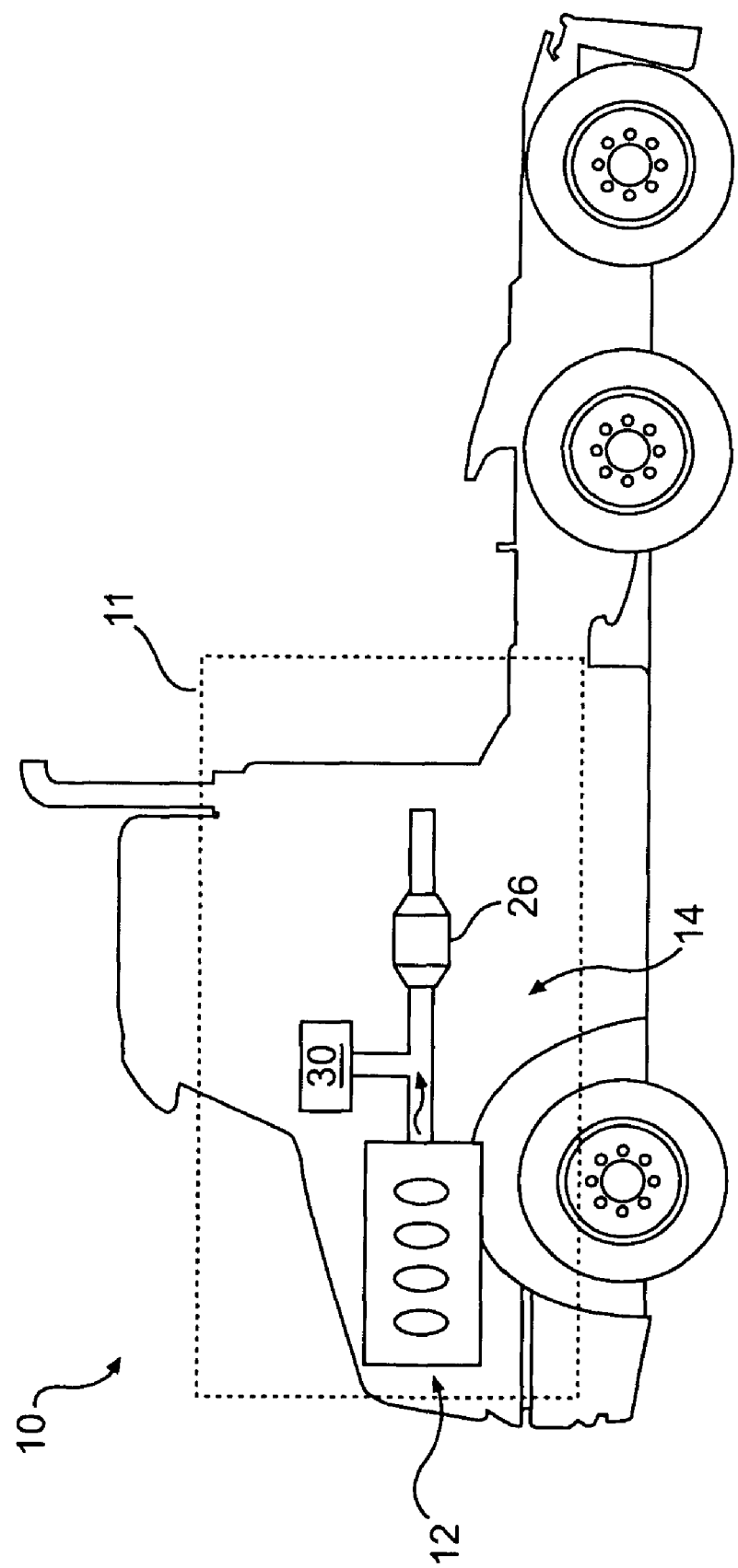
FIG. 1 illustrates a work machine including a NOx-emissions control system, according to an exemplary disclosed embodiment.
Figure 2:
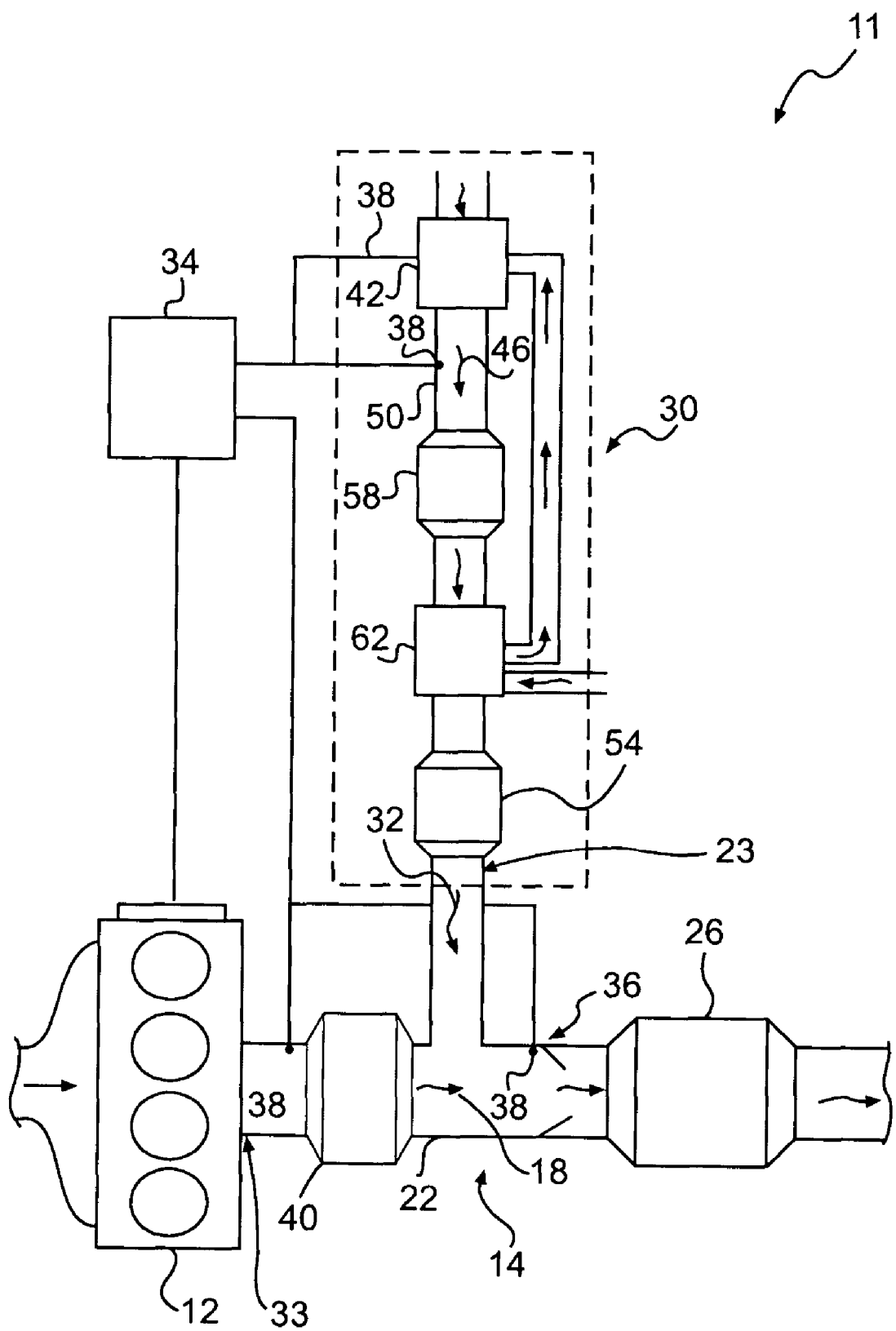
FIG. 2 illustrates a NOx-emissions control system including an on-board ammonia production system, according to an exemplary disclosed embodiment.

FIG. 1 illustrates a work machine 10 including a NOx-emissions control system 11, according to an exemplary disclosed embodiment. NOx-emissions control system 11 may include an engine 12 and an exhaust system 14. Exhaust system 14 may include a selective catalytic reduction (SCR) catalyst 26 disposed downstream of engine 12. An ammonia production system 30 may be configured to supply ammonia to exhaust system 14 to facilitate reduction of NOx produced by engine 12. NOx-emissions control system 11 may further include an engine control unit 34 (as shown in FIG. 2). Control unit 34 may be configured to control the amount of NOx produced by engine 12 and/or the amount of ammonia produced by ammonia production system 30.

To facilitate NOx reduction at SCR catalyst 26, it may be desirable to control the relative amounts of ammonia and NOx flowing into SCR catalyst 26. However, a number of variables may affect the relative rate of flow of ammonia and NOx into SCR catalyst 26. For example, the rate of production of ammonia at production system 30 and of NOx at engine 12 may change due to changing machine operational parameters and/or environmental conditions. In addition, the mass flow rate, system volume, and resistance to gas flow between production system 30 and SCR catalyst 26 may be different than the mass flow rate, system volume, and resistance to gas flow between engine 12 and SCR catalyst 26. These differences may make control of ammonia and NOx ratios at SCR catalyst 26 more difficult. NOx-emissions control system 11 may be configured to control the relative amounts of ammonia and NOx flowing into SCR catalyst 26.

FIG. 2 illustrates a detailed view of NOx-emissions control system 11, according to an exemplary disclosed embodiment. As shown, control system 11 includes engine 12 and exhaust system 14. Engine 12 may produce a NOx-containing exhaust gas stream 18, which may flow into a first exhaust passage 22. As noted, SCR catalyst 26 may be disposed downstream of engine 12, and ammonia production system 30 may be configured to supply an ammonia-containing gas stream 32 to exhaust passage 18 upstream of SCR catalyst 26. Further, SCR catalyst 26 may be configured to facilitate removal of NOx by catalytic reduction, and control unit 34 may be configured to control the concentration and/or mass flow rate of ammonia and NOx at selected locations within exhaust system 14.

SCR catalyst 26 may include a variety of different catalyst types. For example, a variety of different catalyst substrate materials, wash coat compositions, and structures may be selected. The specific catalyst type may be selected based on cost, desired operating temperature range, the amount of NOx expected to be produced during use, and/or any other suitable factor.

In addition, exhaust system 14 may include additional catalysts, filters, or other exhaust system components to facilitate removal of NOx or to control emissions of any exhaust component. For example, as shown, exhaust system 14 includes an upstream catalyst 40. Upstream catalyst 40 may include, for example, an oxidation catalyst, which may facilitate removal of certain chemicals and/or help produce an exhaust gas composition that will facilitate NOx removal at SCR catalyst 26. Further, exhaust system 14 may include any other suitable exhaust system component, including for example, three-way catalysts, additive supply systems, and/or particulate filters.

Ammonia production system 30 may include a variety of ammonia production system configurations. For example, ammonia may be produced by catalytic conversion of NOx to ammonia. Therefore, as shown, ammonia production system 30 may include a NOx source 42 configured to supply a NOx-containing gas stream 46 to an ammonia production system exhaust passage 50. An ammonia-producing catalyst 54 may be disposed downstream of NOx source 42, to allow conversion of NOx within exhaust gas stream 46 into ammonia. The ammonia-containing gas stream 32 produced at ammonia-producing catalyst 54 will be combined with exhaust gas stream 18 to facilitate catalytic reduction of NOx at SCR catalyst 26.

In some embodiments, it may be desirable to mix engine exhaust gas stream 18 and ammonia-containing gas stream 32. For example, exhaust passage 22 may include one or more sets of mixing vanes 36, grates, a perforated plenum, or other suitable structure to facilitate mixing of ammonia with exhaust gas stream 18.

NOx source 42 may include a variety of suitable NOx production systems. For example, NOx source 42 may include, an engine, such as a single cylinder engine, configured to burn fuel to produce NOx. NOx source 42 may also include any other suitable NOx source, such as a burner or stored NOx supply.

As shown, NOx-source 42 may be located on an engine block that is separated from the engine block of engine 12. For example, NOx source 42 may include a single cylinder pony engine dedicated to NOx production for ammonia production system 30, and engine 12 may serve as a primary power source for a machine, such as a truck. This configuration may provide suitable control of ammonia production, without adversely affecting the operational parameters of engine 12. Further, this configuration will facilitate maintenance or replacement of ammonia production system 30 and/or engine 12. In other embodiments, NOx source 42 may include one or more cylinders on the same engine block as engine 12 (as described below).

Ammonia-producing catalyst 54 may be selected from a number of suitable catalyst types. For example, ammonia-producing catalyst 54 may be made from a variety of materials. In one embodiment, ammonia-producing catalyst 54 may include at least one of platinum, palladium, rhodium, iridium, copper, chrome, vanadium, titanium, iron, or cesium. Combinations of these materials may be used, and the catalyst material may be chosen based on cost, the type of fuel used, the air-to-fuel vapor ratio desired, or for conformity with environmental standards. The specific type of catalyst may also be selected to control NOx-to-ammonia conversion efficiency. Further, the catalyst may be selected based on the amount of NOx produced by NOx source 42 and/or the catalyst temperature under selected operating conditions.

Catalyst operation may be affected by a variety of different factors. For example, catalyst operation may be affected by the presence of other chemicals in the surrounding exhaust gas, by catalyst temperature, and/or by contamination with exhaust gas chemicals. In some embodiments of the present disclosure, the temperature of ammonia-producing catalyst 54 may be controlled by cooling NOx-containing gas stream 46 using a cooling system 62, such as a turbocharger, an air-to-gas cooler, or a water-to-gas cooler. In addition, the presence of other chemical species in exhaust gas stream 46 may be controlled by controlling the operation of NOx source 42, through the use of an additive supply device, or through the use of one or more additional catalysts 58 located upstream of ammonia-producing catalyst 54.

NOx-emissions control system 11 may further include a control unit 34, which may monitor and/or control the system operation. In some embodiments, control unit 34 may monitor and/or control the amount of NOx produced by engine 12. Control unit 34 may include an electrical control unit, such as an on-board computer. However, any suitable control unit may be selected. For example, control unit 34 may include a system of mechanically activated valves and/or switches, which may respond to machine operations to control the amount of ammonia supplied by ammonia production system 30.

In other embodiments, control unit 34 will communicate with one or more exhaust gas monitors 38. For example, exhaust gas monitors 38 may include various sensors, such as oxygen sensors, temperature sensors, ammonia sensors, and/or any other suitable sensor or monitor that may provide information related to NOx concentrations at various locations within engine 12 and exhaust system 14. Control unit 34 may control the operation of ammonia production system 30 and engine 12 based on information provided by monitors 38, thereby allowing appropriate control of the amount of ammonia and NOx flowing into SCR catalyst 26.

Figure 3:
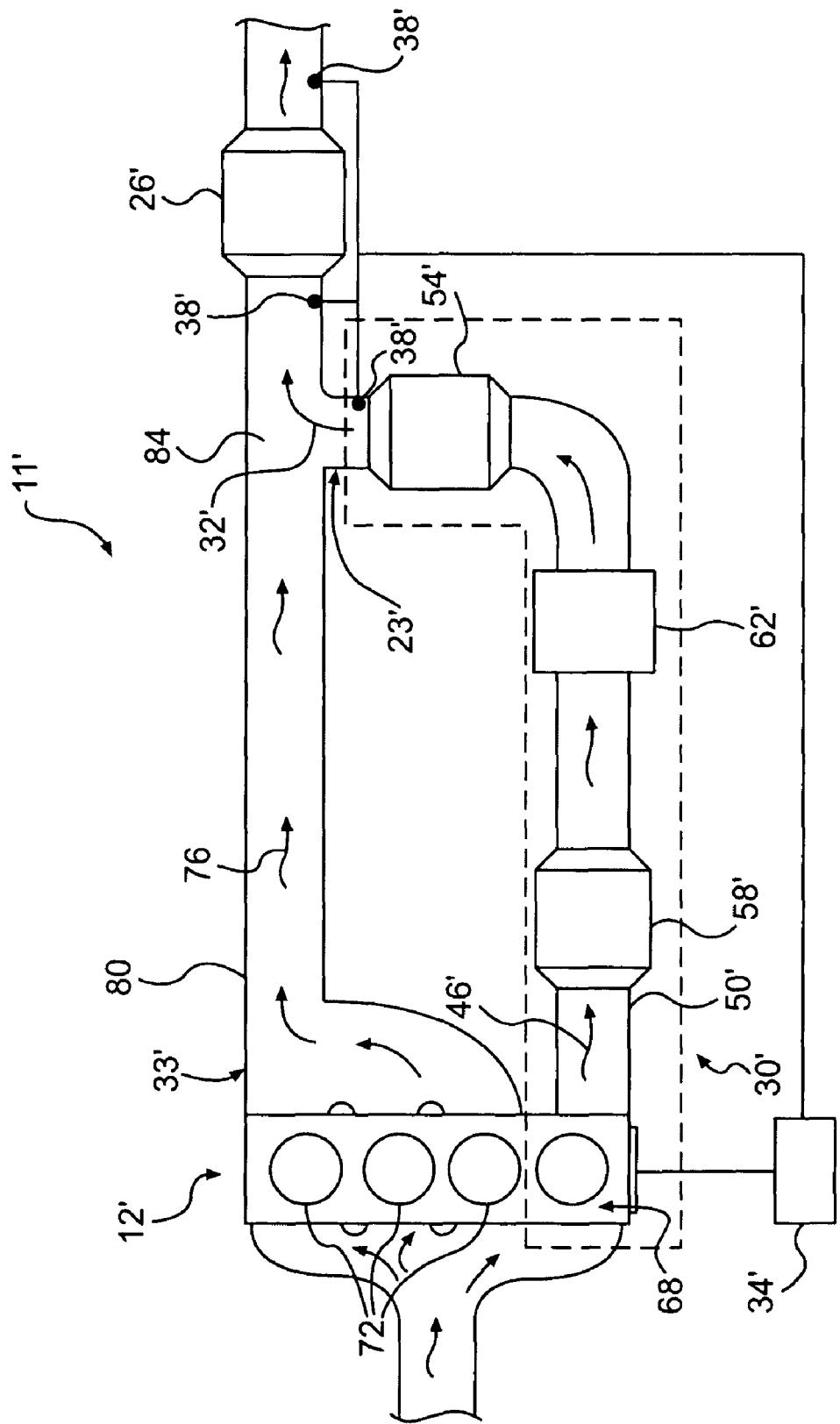
FIG. 3 illustrates a NOx-emissions control system including an on-board ammonia production system, according to another exemplary disclosed embodiment.

As noted previously, in some embodiments, a single engine may serve as both a NOx source for ammonia production and as a primary work machine power source. For example, FIG. 3 illustrates another NOx-emissions control system 11' including a selective catalytic reduction system with on-board ammonia production, according to an exemplary disclosed embodiment. An engine 12' may serve as a NOx source for on-board ammonia production and as a primary machine power source. Engine 12' may include a first cylinder group 68 and a second cylinder group 72. First cylinder group 68 may produce a first NOx-containing exhaust gas stream 46', which may be used to produce ammonia by an ammonia production system 30'. NOx-containing exhaust gas stream 46' may be supplied to an ammonia production system exhaust passage 50' upstream of an SCR catalyst 26'. Further, as in the embodiment of FIG. 2, ammonia production system 30' may include a variety of additional components, such as one or more upstream catalysts 58' and/or cooling systems 62'.

Second cylinder group 72 may produce most of the engine power for a work machine, such as a truck, and will produce a second NOx-containing exhaust gas stream 76. NOx-containing exhaust gas stream 76 from second cylinder group 72 may flow into an exhaust passage 80. Further, as shown, on-board ammonia production system 30' may be configured to supply an ammonia-containing gas stream 32' to exhaust passage 80 upstream of an SCR catalyst 26'. Ammonia-containing gas stream 32' and engine NOx-containing gas stream 76 may flow into a merged exhaust passage 84, which is in fluid communication with SCR catalyst 26'.

As noted, first cylinder group 68 and second cylinder group 72 may be located on a single engine 12'. As shown, first cylinder group 68 includes a single cylinder, and second cylinder group 72 includes three cylinders. However, first and second cylinder groups 68, 72 may include any suitable number of cylinders. For example, engine 12' may include a four, six, eight, or twelve cylinder engine; and first cylinder group 68 may include one or more cylinders. Further, engine 12' may include any suitable engine configuration, including for example, an in-line configuration or V configuration.

First cylinder group 68 and second cylinder group 72 may have different operational characteristics. For example, first cylinder group 68 may have different air-to-fuel ratios, may employ a different combustion strategy, may include an exhaust gas additive supply device, may have different compression ratios, may have different cylinder sizes, may include a different number of cylinders, and/or may operate at different temperatures than second cylinder group 72. In some embodiments, first cylinder group 68 may be configured to maximize NOx production for a given quantity of fuel used, thereby increasing ammonia production by ammonia production system 30'.

As described previously, single engine 12' and ammonia production system 30' may be operatively connected with a control unit 34' and one or more exhaust gas monitors 38'. Control unit 34' and monitors 38' may be configured to facilitate control of ammonia and NOx production to control relative amounts of ammonia and NOx flowing through SCR catalyst 26'.

Figure 4:
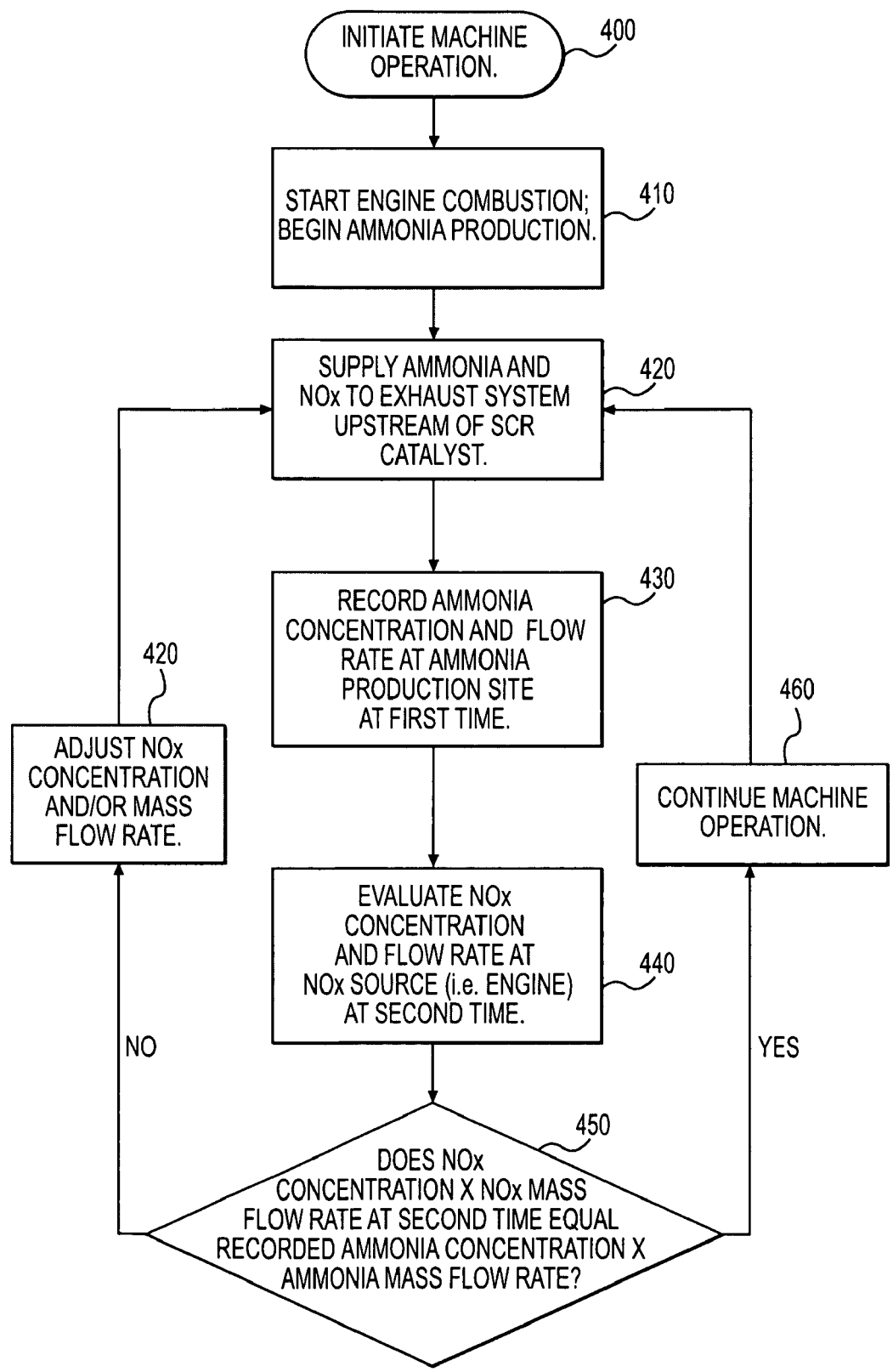
FIG. 4 is a flowchart illustrating a method for controlling production of ammonia and NOx for selective catalytic reduction systems.

FIG. 4 is a flowchart illustrating a method for controlling production ammonia and NOx for selective catalytic reduction systems. First, machine operation may be initiated (e.g. powering up a truck), as indicated at 400. Generally, machine operation will commence with initiation of engine combustion and production of ammonia within an on-board ammonia production system, as indicated at 410. However, in some situations, it may be desirable to delay ammonia production for a certain time after initiation of engine operation. For example, after a cold-engine start, SCR catalysts may function less efficiently, and it may be desirable to wait until the catalyst temperature reaches a suitable range for SCR operation before producing ammonia.

Next, ammonia produced with an on-board production system and NOx produced by an engine may be supplied to selected exhaust system locations upstream of one or more SCR catalysts, as indicated at 420. To facilitate control of the relative amounts of ammonia and NOx flowing into downstream SCR catalysts, the ammonia concentration and/or mass flow rate at selected exhaust system locations may be determined and/or recorded at a first time. Generally, the ammonia concentration and/or mass flow rate may be recorded at the site of ammonia production, but any suitable exhaust suitable location may be selected.

It should be noted that ammonia concentrations and/or mass flow rates may be determined using direct measurement or indirect determinations. For example, ammonia concentrations and/or mass flow rates may be evaluated using gas sensors and/or flow sensors operatively connected with the exhaust system. Alternatively, the ammonia concentrations and/or mass flow rates may be determined empirically. For example, for a selected ammonia production system, the ammonia concentration and mass flow rate may be determined based on system operating parameters. Further, ammonia concentrations and/or mass flow rates may be recorded continuously or at predetermined intervals.

In some embodiments, a control unit may determine and record ammonia concentrations and mass flow rates. For example, if an engine is used as a NOx-source for a selected ammonia production system, the control unit may monitor or select various engine-operating parameters, including for example, power output, air-to-fuel ratios, temperature, and/or combustion strategy. These operating parameters may be associated with ammonia concentrations and/or mass flow rates. The control unit may store associated operating parameters, ammonia concentrations, and/or mass flow rates in a look-up table or other suitable storage system and record changing ammonia concentrations and/or mass flow rates, as indicated at 430.

Generally, the exhaust gas transit time between the ammonia production system and SCR catalyst will be greater than the exhaust gas transit time between the engine and SCR catalyst. This difference may be due to a number of factors. For example, because the rate of combustion within the engine may be higher than the rate of combustion within a combustion-based ammonia production system, the mass flow rate from the engine is generally higher than the mass flow rate from the ammonia production system engine. In addition, the resistance to fluid flow between the ammonia production system and SCR catalyst may be higher than the resistance between the engine and SCR catalyst.

To account for the longer exhaust gas transit time between the ammonia production system and SCR catalyst, the NOx production rate from the engine may be evaluated and/or adjusted at a second time, as indicated at 440 and 450. In some embodiments, the second time may be set as a predetermined time interval after the first time at which the ammonia concentration was recorded. For example, a predetermined time interval may be selected based on the difference between the exhaust gas transit time from the ammonia production system to SCR catalyst and the exhaust gas transit time between the engine and SCR catalyst (hereinafter the ammonia lag time).

For some systems, the ammonia lag time will be approximately constant. For example, for a selected engine and exhaust system, the ammonia lag time may be determined based on normal operating conditions. For example, normal operating conditions for a truck may correspond to engine and exhaust system conditions during highway travel between fifty and seventy miles per hour. In other embodiments, the ammonia lag time may vary based on machine operating conditions, such as power output, fuel compositions, and/or operator abilities. For machine operation having substantially variable ammonia lag time, the control unit may be configured to monitor and/or control engine operating conditions and to determine the appropriate ammonia lag time for given operating conditions. For example, the ammonia lag may be determined by known resistances to fluid flow within various exhaust system components and based on known or measured mass flow rates.

The NOx production rate at the second time, which is later than the first time, may be compared to the ammonia production rate previously determined at the first time using a variety of techniques. For example, in some embodiments, the NOx production rate may be expressed as the concentration of NOx of the engine exhaust gas stream multiplied by the mass flow rate leaving the engine. To account for differences in exhaust gas transit times between the ammonia production system and SCR catalyst and the engine and SCR catalyst, the NOx concentration at the second location at the second time multiplied by the current mass flow rate at the second location may be considered to be approximately equal to the mass flow rate from the ammonia production system at the second time multiplied by the ammonia concentration at the first time. This can be expressed as:

$$m_1(t_2) \cdot C_{NO}(0, t_2) \approx m_2(t_2) \cdot C_{NH_3}(0, t_2 - \partial t)$$

wherein, $C_{NH_3}(0, t_2-dt)$ equals the ammonia concentration at an ammonia production system at time $(t_2)$ minus an interval $(dt)$; $C_{NO_x}(0, t_2)$ equals the NOx concentration at the engine and at the second time $(t_2)$; $m_2(t_2)$ equals the mass flow rate leaving an ammonia production system at the second time $(t_2)$; $m_1(t_2)$ equals the mass flow rate leaving the engine at the second time $(t_2)$.

From this, a desired current NOx concentration at the engine may be determined as:

$$C_{NO_x}(0, t_2) \approx \frac{m_2(t_2) \cdot C_{NH_3}(0, t_2 - \partial t)}{m_1(t_2)}$$

It should be noted that the mass flow rate from the ammonia source $(m_2)$ is selected as the current mass flow rate. This is appropriate if the mass flow rate from the ammonia source is approximately constant compared to other changes in the system. For example, if the variation in mass flow rate from the ammonia source is small compared to the variation in mass flow rate from the engine, the current mass flow rate from the ammonia source may be used. Alternatively, an average mass flow rate for the ammonia production system may be used.

Further, the ammonia and NOx concentrations and/or mass flow rates may be determined at a variety of suitable exhaust system locations. For example, to determine the ammonia concentration and/or mass flow rate at an ammonia production system, the ammonia concentration may be measured at or near the location where the ammonia-containing gas stream enters an exhaust passage upstream of an SCR catalyst. Further to determine the NOx concentration and/or mass flow rate, the NOx concentration may be measured at or near the location where the NOx-containing gas stream enters an exhaust passage upstream of an SCR catalyst. For example, in the embodiments of FIGS. 2 and 3, the ammonia concentration may be determined at a first location 23, 23'; and the NOx concentration may be determined at a second location 33, 33'. Any suitable exhaust system locations may be selected to determine ammonia and NOx concentrations and/or mass flow rates, as long as the exhaust gas transit time from the selected location to the downstream catalyst may be determined.

Returning back to FIG. 4, the NOx output from the engine at the second time may be evaluated, as indicated at 450. If the NOx concentration is approximately equal to the desired concentration, the system will continue the machine operation to maintain the current NOx production rate, as indicated at 460. However, if the NOx concentration at the engine at the second time deviates from the desired concentration, the engine operation may be adjusted to change the NOx concentration and/or mass flow rate to produce a desired ratio of ammonia and NOx at downstream catalysts, as indicated at 470.

The NOx concentration produced by the engine may be controlled in a variety of ways. For example, the air-to-fuel ratio within one or more engine cylinders may be varied to produce a desired NOx concentration. In addition, various other engine operating parameters may be controlled to produce a desired NOx concentration. Such parameters may include, for example, concentrations of fuel or exhaust additives, operating temperatures, power output, and/or any other suitable parameters.

In some embodiments, the ammonia produced by a selected ammonia production system may be set at a predetermined production rate. The production rate may be a desired range selected based on typical engine operating parameters. In addition, the control unit may control the desired range based on current machine demands, such as load, speed, and/or other machine operating conditions. For example, during periods of higher power demand, (e.g. higher speed driving, heavy loads, uphill driving), the NOx production from the engine may increase to meet the added power demands, and the ammonia production rate range may be adjusted accordingly. Further, during continuous machine operation the ammonia production system may be configured to continuously produce ammonia for reduction of NOx produced by engine combustion. Alternatively, the ammonia production system may be configured to produce ammonia only during periods of relatively high NOx production (e.g. during periods of higher power demands).

Once the desired ammonia production rate range has been selected, the NOx output rate of the engine may be controlled to maintain the flow rates of ammonia and NOx at SCR catalysts within the desired range, as described previously. For example, in some embodiments, the operation of the engine may be controlled to optimize fuel efficiency and/or control power output, while producing a desired amount of NOx for downstream reduction.

It should be noted that leaner engine operation generally produces higher levels of NOx, but also tends to produce better fuel economy. Therefore, in some embodiments, it may be desirable to maximize ammonia production and to maintain engine operation in a relatively lean state to produce high fuel efficiency and NOx production. Generally, the NOx source of an ammonia production system will be relatively small compared to the cylinders of a primary machine power source. Therefore, for a given ammonia production system, it may be desirable to maximize ammonia production to allow lean engine operation.

In addition, the relative amounts of ammonia and NOx flowing into the SCR catalyst may be selected based on a number of different factors. For example, under some conditions, it may be desirable to supply a stoichiometric amount of ammonia and NOx to a catalyst. By supplying a stoichiometric amount of ammonia and NOx to a catalyst, all the ammonia and NOx may react to form nitrogen gas and water, thereby preventing release of ammonia and NOx to the environment.

Generally, even when a stoichiometric amount of ammonia is supplied to SCR catalysts, it may be difficult to achieve complete NOx conversion, due to practical limits on catalyst capacity, variations in catalyst temperature, competing exhaust gas species, and/or inadequate mixing. Therefore, in some embodiments, it may be desirable to control the rates of ammonia and NOx flow to provide non-stoichiometric amounts of ammonia and NOx to a catalyst. For example, at higher temperatures (e.g. greater than 500° C.), partial oxidation of ammonia may occur in the SCR catalyst, thereby rendering some of the ammonia ineffective for reduction of NOx. Therefore, to account for ammonia oxidation, it may be desirable to supply additional ammonia to the catalyst. In some embodiments, greater than stoichiometric amounts of ammonia may be supplied to SCR catalysts. For example, in some embodiments, the ratio of ammonia to NOx flowing into the catalyst may be about 1.1:1, about 1.2:1, or about 1.3:1.

In still other embodiments, it may be desirable to supply a less than stoichiometric amount of ammonia to the catalyst. For example, less than stoichiometric amounts of ammonia may be selected to prevent ammonia slip if a catalyst's capacity is exceeded during periods of high NOx production or sub-optimal catalyst temperature (e.g. after cold start). Further, in some embodiments, multiple SCR catalysts may be used, and a less than stoichiometric amount of ammonia may be supplied upstream of one or more catalysts.

It should be noted that control unit 34, 34' may be configured to evaluate and record the ammonia concentration continuously or at very short time intervals, and in some cases, control unit 34, 34' will record ammonia concentrations and mass flow rates at intervals that are substantially shorter than the ammonia lag time. For example, control unit 34, 34' may record ammonia concentrations or production rates at intervals between about 0.05 second and 0.1 about 0.1 seconds. Further, ammonia lag times may be up to two seconds for some exhaust system configurations. Therefore, it should be understood that control unit 34, 34' may be configured to store numerous ammonia concentrations and production rates simultaneously. Control unit may further perform an evaluation of NOx production rates for each recorded ammonia concentration and rate, and if needed, alter NOx production to maintain appropriate ratios of ammonia and NOx at SCR catalysts 26, 26'. Therefore, although FIG. 4 illustrates one cycle of an evaluation loop performed by control unit 34, 34', control unit 34, 34' may be configured to perform multiple steps of the method simultaneously (i.e. record multiple ammonia concentrations and flow rates while evaluating and/or controlling later NOx production rates).

INDUSTRIAL APPLICABILITY

The present disclosure provides an exhaust-gas emissions control system, including a system for controlling ammonia and NOx levels. This system may be useful in all exhaust systems that require SCR.

On-board ammonia production may provide an effective method for supplying needed reductants to SCR systems. To maintain a suitable level of NOx conversion efficiency at the SCR catalyst, while preventing ammonia slip, the amounts of ammonia and NOx flowing into a catalyst bed must be appropriately matched. Matching of the rate of ammonia production by an on-board production system with the rate of NOx production within an engine may be effective under some circumstances. However, for many exhaust systems, the mass flow rates from the engine and ammonia source are variable. Further, the exhaust system transit times between the ammonia production system and catalyst bed and between the engine and catalyst bed may differ substantially. Variations in mass flow rates and/or exhaust gas transit times may cause a mismatch between ammonia and NOx levels at the catalyst bed even when the rates of production of ammonia and NOx are equal.

The present disclosure provides a system and method for matching ammonia and NOx levels at the site of NOx reduction, the catalyst bed. The ammonia and NOx production rates are monitored continuously during machine operation. The ammonia concentration is recorded, and the rate of NOx production is adjusted based on the previously recorded ammonia concentration. Since the exhaust system transit time between the ammonia production system and catalyst bed will generally be longer than the exhaust system transit time between the engine and catalyst bed, the ammonia and NOx levels at the catalyst bed can be appropriately matched. Accordingly, using the system and method of the present disclosure, NOx reduction by SCR can be optimized and ammonia slip can be minimized.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A method of controlling ammonia and nitric oxides production for selective catalytic reduction systems, comprising:
   producing an ammonia-containing gas stream having an ammonia concentration;
   operating an engine to continuously produce a NOx-containing gas stream having a NOx concentration;
   supplying the ammonia-containing gas stream to an exhaust system upstream of a selective catalytic reduction catalyst and evaluating the ammonia concentration at a first location at a first time;
   supplying the NOx-containing gas stream to the exhaust system upstream of the selective catalytic reduction catalyst;
   evaluating the NOx concentration at a second location at a second time, the second time being later than the first time by a time interval, the time interval being based on the difference between a time required for the ammonia-containing gas stream to travel from the first location to the selective catalytic reduction catalyst and a time required for the NOx-containing gas stream to travel from the second location to the selective catalytic reduction catalyst; and adjusting the NOx concentration based at least on the ammonia concentration at the first time and the NOx concentration at the second time.

2. The method of claim 1, wherein producing the ammonia-containing gas stream includes:
producing NOx in a second engine separate from the engine producing the NOx-containing gas stream; and
supplying the NOx to an ammonia-producing catalyst.

3. The method of claim 1, wherein the ammonia-containing gas stream is produced continuously.

4. The method of claim 1, further including mixing the ammonia-containing gas stream and NOx-containing gas stream upstream of the selective catalytic reduction catalyst.

5. The method of claim 1, wherein the ammonia-containing gas stream is supplied to the exhaust system at the first location at a first mass flow rate and the NOx-containing gas stream is supplied to the exhaust system at the second location at a second mass flow rate.

6. The method of claim 1, wherein the NOx concentration is adjusted such that:

$$C_{NO_x}(0, t_2) \approx \frac{m_2(t_2) \cdot C_{NH_3}(0, t_2 - \partial t)}{m_1(t_2)}$$

wherein, $C_{NH_3}(O, t_2 - dt)$ equals the ammonia concentration at an ammonia production system at the second time ($t_2$) minus an interval (dt); $C_{NO_x}(0, t_2)$ equals the NOx concentration at the engine at the second time ($t_2$); $m_2(t_2)$ equals a mass flow rate leaving an ammonia production system at the second time ($t_2$); and $m_i(t_2)$ equals a mass flow rate leaving the engine at the second time ($t_2$).

7. The method of claim 1, wherein the NOx concentration is adjusted by adjusting an air-to-fuel ratio within one or more cylinders of the engine.

8. The method of claim 1, wherein the NOx concentration is produced at approximately a stoichiometric level for reaction with the ammonia at the first location.

9. The method of claim 1, wherein the NOx concentration is produced at a concentration greater than the stoichiometric level for reaction with the ammonia at the first location.

10. The method of claim 1, wherein the NOx concentration is produced at a concentration less than the stoichiometric level for reaction with the ammonia at the first location.

11. The method of claim 1, wherein the ammonia concentration is maintained at a substantially constant level.

12. The method of claim 11, wherein the substantially constant level is a maximum level for a selected ammonia production system.

13. An engine and exhaust system, comprising:
an ammonia production system configured to supply ammonia to an exhaust system;
an engine configured to continuously supply a NOx-containing exhaust gas stream to the exhaust system;
a selective catalytic reduction catalyst positioned downstream of a location where the ammonia and the NOx containing exhaust gas stream enters the exhaust system; and a control unit configured to evaluate an ammonia concentration at a first location at a first time and a NOx concentration at a second location at a second time, the second time being later the first time by a time interval, the time interval being based on the difference between a time required by the ammonia to travel from the first location to the selective catalytic reduction catalyst and a time required by the NOx-containing exhaust gas stream to travel from the second location to the selective catalytic reduction catalyst, and control the rate of NOx production by the engine based on at least the ammonia concentration at the first time and the NOx concentration at the second time.

14. The engine and exhaust system of claim 13, wherein the ammonia production system includes:
at least one engine cylinder configured to produce a NOx-containing gas stream; and
an ammonia-producing catalyst disposed downstream of the at least one engine cylinder.

15. The engine and exhaust system of claim 14, wherein the at least one engine cylinder of the ammonia production system is a cylinder of the engine configured to supply the NOx-containing exhaust gas stream to the exhaust system.

16. The engine and exhaust system of claim 14, wherein the at least one engine cylinder of the ammonia production system is located on a second engine, the second engine being separate from the engine configured to supply the NOx-containing exhaust gas stream to the exhaust system.

17. A NOx-emissions control system, comprising:
an ammonia production system configured to supply ammonia to a first exhaust passage;
an engine configured to continuously supply an exhaust gas stream to a second exhaust passage;
a merged exhaust passage downstream of both the ammonia production system and the engine;
at least one selective catalytic reduction system catalyst in fluid communication with the merged exhaust passage; and
a control unit configured to adjust the rate of NOx production by the engine based on at least the rate of ammonia production and the difference in gas transit times from the ammonia production system to the selective catalytic reduction system and from the engine to the selective catalytic reduction system.

18. The NOx-emissions control system of claim 17, wherein the control unit includes an engine electrical control unit.

19. The NOx-emissions control system of claim 17, further including an exhaust-gas mixing system.

20. The NOx-emissions control system of claim 17, further including at least one exhaust sensor.

21. The NOx-emissions control system of claim 17 wherein, the control unit is configured to evaluate the ammonia concentration at a first time and the NOx concentration at a second time later than the first time and adjust the rate of NOx production by the engine such $$C_{NO_x}(0, t_2) \approx \frac{m_2(t_2) \cdot C_{NH_3}(0, t_2 - dt)}{m1(t_2)},$$

that wherein, $C_{NH_3}(0, t_2 -dt)$ equals the ammonia concentration at the ammonia production system at the second time ($t_2$) minus an interval (dt);
$C_{NO_x}(0, t_2)$ equals the NOx concentration at the engine at the second time ($t_2$); $m_2(t_2)$ equals a mass flow rate leaving an ammonia production system at the second time ($t_2$); and $m_j(t_2)$ equals a mass flow rate leaving the engine at the second time ($t_2$).

22. The NOx-emissions control system of claim 17 wherein, the ammonia production system includes a second engine that is configured to direct NOx to an ammonia-producing catalyst, the second engine being separate from the engine configured to supply the exhaust gas stream to the second exhaust passage.

* * * * *